United States Patent
Fansler et al.

(10) Patent No.: US 10,163,141 B2
(45) Date of Patent: Dec. 25, 2018

(54) TRANSACTION-BASED FUEL PURCHASE AUTHORIZATION

(75) Inventors: Thomas S. Fansler, Plymouth, MN (US); Ronald Edward Konezny, Shorewood, MN (US)

(73) Assignee: Trimble Navigation Limited, Sunnyvale, CA (US)

( * ) Notice: Subject to any disclaimer, the term of this patent is extended or adjusted under 35 U.S.C. 154(b) by 529 days.

(21) Appl. No.: 13/538,742

(22) Filed: Jun. 29, 2012

(65) Prior Publication Data

US 2013/0013431 A1    Jan. 10, 2013

Related U.S. Application Data

(60) Provisional application No. 61/506,007, filed on Jul. 8, 2011.

(51) Int. Cl.
*G06Q 30/06* (2012.01)
*G07F 13/02* (2006.01)

(52) U.S. Cl.
CPC ........... *G06Q 30/06* (2013.01); *G07F 13/025* (2013.01)

(58) Field of Classification Search
CPC combination set(s) only.
See application file for complete search history.

(56) References Cited

U.S. PATENT DOCUMENTS

| | | | |
|---|---|---|---|
| 6,522,947 B1 * | 2/2003 | Hartsell, Jr. .................. | 700/241 |
| 7,899,591 B2 * | 3/2011 | Shah et al. .................... | 701/29.4 |
| 8,280,619 B2 * | 10/2012 | Watkins ........................ | 701/123 |
| 8,433,471 B2 * | 4/2013 | Christensen et al. ........ | 701/29.1 |
| 2011/0172816 A1 * | 7/2011 | Ezra .............................. | 700/237 |

FOREIGN PATENT DOCUMENTS

FR    2902219 A1 * 12/2007

* cited by examiner

*Primary Examiner* — Luna Champagne
(74) *Attorney, Agent, or Firm* — Hollingsworth Davis, LLC

(57) ABSTRACT

Techniques for authorizing fuel purchases based on vehicle available fuel tank capacity. The authorization may be performed on a transaction basis, such that each fueling event may be independently authorized. A current fuel tank capacity for the vehicle is obtained, and transmitted to an authorization entity. An authorization is obtained for dispensing a quantity of fuel that does not exceed the current fuel tank capacity.

34 Claims, 11 Drawing Sheets

TRANSACTION-BASED FUEL PURCHASE AUTHORIZATION

RELATED APPLICATIONS

This application claims the benefit of Provisional Patent Application No. 61/506,007, filed on Jul. 8, 2011, to which priority is claimed pursuant to 35 U.S.C. § 119(e) and which is incorporated herein by reference in its entirety.

SUMMARY

Embodiments described in this disclosure are generally directed to authorizing fuel purchases based on available fuel tank capacity for a vehicle. The authorization may be performed on a transaction basis, such that each (or any desired) fueling event may be independently authorized. In one embodiment, a current fuel tank capacity for the vehicle is obtained, and transmitted to an authorization entity. An authorization is obtained for dispensing a quantity of fuel that does not exceed the current fuel tank capacity.

In another embodiment, fuel tank capacity is calculated, rather than being sensed. For example, a current fuel tank capacity for a vehicle may be calculated based on a difference between a previously known fuel tank level for the vehicle and a calculated fuel consumption based at least on estimated fuel consumption rate and distance traveled. The calculated current fuel tank capacity is provided to an authorization module, and in return an authorization of a quantity of authorized fuel is received from the authorization module. The method further involves making the authorization of the quantity of authorized fuel available at the vehicle to limit a quantity of dispensed fuel to the quantity of authorized fuel.

In another representative embodiment, an apparatus is provided that includes a receiver configured to receive a fuel tank level indication for a fuel tank in a vehicle, and storage to at least temporarily store a total fuel tank capacity of the fuel tank. The apparatus includes a processor configured to calculate the quantity of fuel that would fill the fuel tank based on at least the fuel tank level indication and the total fuel tank capacity of the fuel tank. A transmitter is configured to wirelessly transmit an authorization request to an authorization entity to obtain authorization to purchase fuel for no more than the quantity of fuel that would fill the fuel tank.

Another embodiment involves a system that includes an apparatus that includes a receiver configured to receive a fuel tank level indication for a fuel tank in a vehicle, and storage to at least temporarily store a total fuel tank capacity of the fuel tank. The apparatus includes a processor configured to calculate the quantity of fuel that would fill the fuel tank based on at least the fuel tank level indication and the total fuel tank capacity of the fuel tank. A transmitter is configured to wirelessly transmit an authorization request to an authorization entity to obtain authorization to purchase fuel for no more than the quantity of fuel that would fill the fuel tank. The representative system further includes a fuel dispensing mechanism coupled to receive the authorization to purchase fuel for no more than the quantity of fuel that would fill the fuel tank, and to disable dispensing of the fuel after the quantity of fuel that would fill the fuel tank has been dispensed.

This summary introduces representative concepts that are further described in the ensuing description. The summary is not intended to identify essential features of current or future claimed subject matter, nor is it intended to be used to limit the scope of the claimed subject matter.

DETAILED DESCRIPTION

Figure 1:
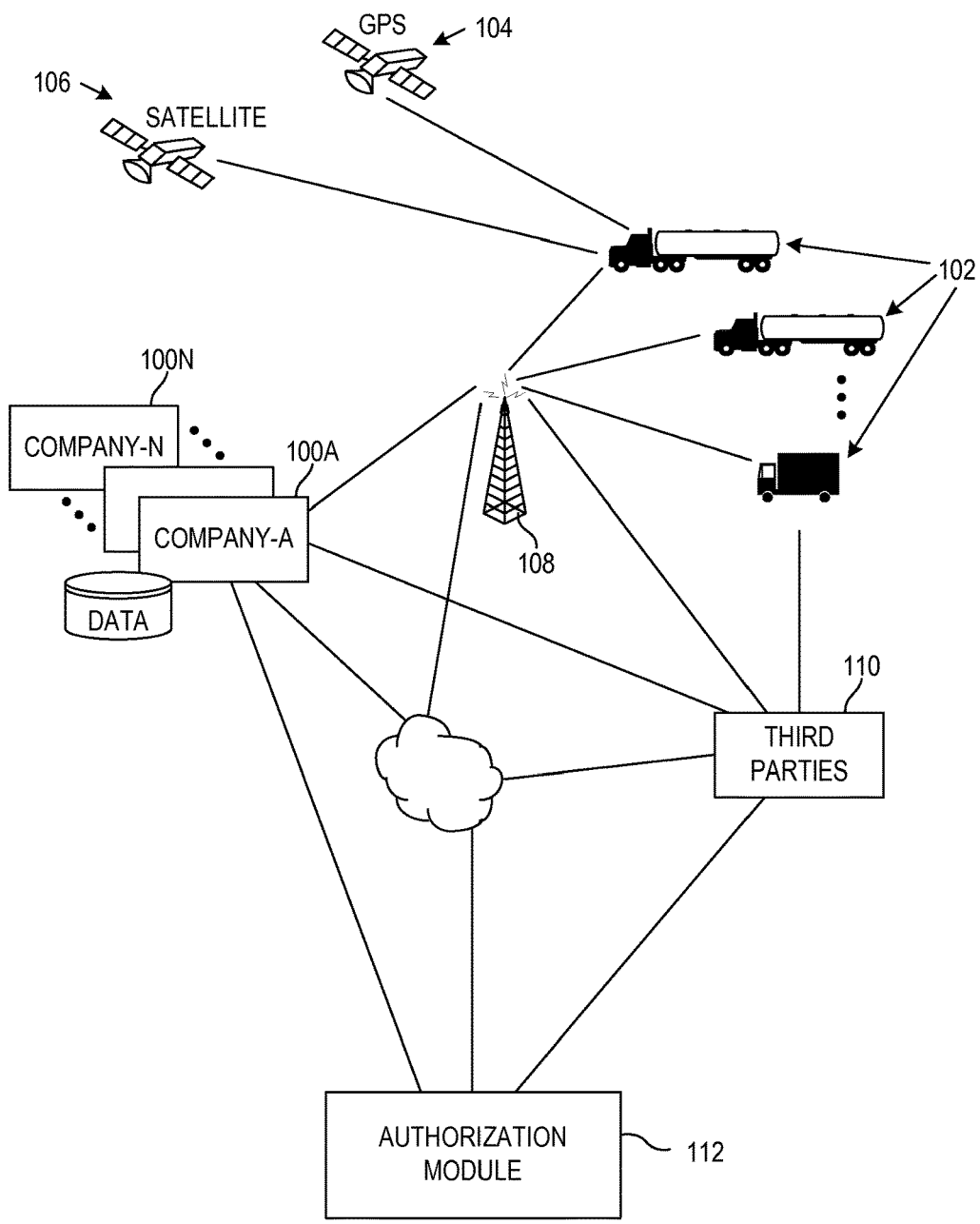
FIG. 1 is a block diagram illustrating a representative environment in which the principles described herein may be practiced.

In the following description, reference is made to the accompanying drawings that depict representative implementation examples. It is to be understood that other embodiments and implementations may be utilized, as structural and/or operational changes may be made without departing from the scope of the disclosure.

The disclosure is generally directed to fuel purchase authorization. While the disclosure is directed primarily to trucks and fleets of trucks, the principles described herein are equally applicable to any vehicles or machines in which fuel or other energy sources are expended, such as cars, motorcycles, watercraft, airborne vehicles, or any other vehicle or machine, whether meant for transporting people/ objects, or even meant to remain substantially immobile.

It should be noted that the term "fuel" is predominantly used herein, as one environment in which the principles described herein is in the context of trucks and/or truck fleets that typically use diesel fuel. However, the principles described herein are applicable to vehicles or machines that consume fuel, gas, or other material that stores energy for subsequent combustion or other extraction to perform work. Thus, references to fuel are intended to encompass any fuel, whether diesel fuel, gasoline, synthetic fuels, and/or other material that is used to power vehicles.

Implementations may be used in connection with vehicles ranging from a single vehicle to large fleets of vehicles having different characteristics. Fuel capacity and other relevant data associated with the vehicles can be gathered in numerous ways described herein, and authorization to purchase an amount of fuel to substantially fill the fuel tank is sought and received in connection with the fueling process.

More particularly, techniques described herein address, among other things, determining the quantity of fuel (or other energy source) that would substantially fill a fuel tank on a vehicle. If a vehicle has an approximately one-hundred gallon tank, and the fuel level is at approximately forty gallons, then it would take approximately sixty gallons to fill the tank (thus, sixty gallons representing the current fuel tank capacity). If a driver at a fueling station dispensed more than sixty gallons in such a situation, it is possible that some of the dispensed fuel was dispensed into another vehicle, into a portable container, or otherwise dispensed somewhere other than into the target vehicle's fuel tank. This is typically indicative of fuel theft.

For example, if the above scenario occurred with a driver of a commercial truck owned by company-A, and the driver dispensed eighty gallons of fuel when the truck required only approximately sixty gallons to fill the truck's tank, it suggests that the driver dispensed approximately twenty gallons somewhere other than into the truck's fuel tank. In another example, any vehicle driver could also make what is alleged to be a "business" fuel transaction where tax deductions may apply, and put some gas or other fuel into a non-business vehicle in an effort to get a business tax deduction on some non-business (i.e. personal) fuel consumption. These and other scenarios illustrate how fuel purchases can result in fuel being dispensed into unauthorized vehicles or containers (e.g. for personal use or gain), where the fuel purchase should have been solely for another purpose(s) (e.g. business use).

The trucking industry is an example of an industry that experiences losses due to fuel theft. Some estimates have shown fuel theft to be in the range of 1% to 2% of total fuel purchased, which can result in annual losses at or well above a billion dollars per year. A significant amount of fuel theft occurs when dispensing fuel—i.e. at the fueling station. A driver can use a corporate credit card, fuel card, company cash, and/or other business assets to purchase fuel for his/her truck. By dispensing fuel into the truck, and then dispensing additional fuel into one or more other vehicles or containers, the driver can receive fuel paid for by the company assets. The other vehicles/containers may belong to the driver, or to another individual(s). Additionally, drivers may be subject to a daily "cap" of some number of gallons or dollars of fuel. Such a cap may be enforced by way of verbal instructions, credit card limits, fuel card limits, etc. If the driver has not reached the daily cap, one scenario is that the driver might sell the remaining amount to another vehicle driver for a lesser amount than the fuel would actually cost, whereby the business owner is in essence paying the difference.

The techniques described herein address these and other issues by seeking authorization to dispense an amount of fuel corresponding to a current fuel capacity of the vehicle in which fuel is to be dispensed. While post-transaction analysis may be performed to determine whether a driver may have once, or more habitually engaged in fuel theft, a post-transaction analysis does not prevent the fuel theft from occurring. Rather, it provides data-based evidence to attempt to take corrective action. On the other hand, the principles described herein are proactive, and can actually prevent fuel theft at the point of transaction. In one embodiment, the solution is transaction-based such that the fuel transactions attempted by the driver are authorized on a transaction basis. In other embodiments, the solution can be based on pre-established routes, where authorization for fuel purchases is based on compliance with the route as well as the current fuel tank capacity.

The present disclosure thus describes the ability to mitigate, and in some cases entirely prevent fuel theft by, for example, authorizing fuel purchases at the transaction/event level in real time. Some embodiments are directed to authorizing fuel purchases based on vehicle available fuel tank capacity. The authorization may be performed on a transaction basis, such that each fueling event may be independently authorized. In one embodiment, a current fuel tank capacity for the vehicle is obtained, and transmitted to an authorization entity. An authorization is obtained for dispensing a quantity of fuel that does not exceed the current fuel tank capacity.

FIG. 1 is a block diagram illustrating a representative environment in which the principles described herein may be practiced. The example of FIG. 1 assumes that one or more entities, labeled company-A 100A through company-N 100N manages a fleet of one or more vehicles. Representative trucks 102 are associated with company-A 100A in the illustrated embodiment. The company-A 100A may track locations of the vehicles 102 using location services, such as cellular triangulation, global positioning system (GPS) 104 or other satellite 106 tracking mechanisms, and/or other manners of tracking the movement and location of the fleet. Other information may be gathered by the dispatch company-A 100A that may be provided by the vehicles 102 to the company-A 100A by any desired means, such as data transmission via the cellular infrastructure represented by the cellular base station 108. The information may be provided in other manners, such as via satellite 106 and/or other data delivery mechanisms. Company-A 100A may utilize the information in its fleet dispatch operations. Information concerning the vehicles 102 may instead or additionally be collected by one or more third parties 110, such as fuel card providers, mobile communication companies and/or others.

At least some of the information provided by the vehicles 102 and collected by the company-A 100A and/or third parties 110 is information that directly or indirectly relates to fuel consumption, and in particular, the fuel capacity of the respective truck's fuel tank. For example, vehicles such as commercial trucks typically include an engine control module (ECM) or other electronic control unit that is associated with the engine of the respective vehicle. In addition to assisting with operational functions such as controlling fuel mixture, timing, idle speed, etc., ECMs are capable of providing the data to which they are privy to. For example, an ECM includes a data bus to provide engine data such as fuel tank level, RPM, speed, calculated miles per gallon (MPG) of fuel consumed, miles traveled, engine idle time, engine hours, and the like. Such data may be used by an onboard computer (not shown) on the vehicle 102, and/or provided to the company-A 100A and/or one or more third parties 110, to determine fuel tank capacity for obtaining fuel purchase authorizations as described herein.

In accordance with one embodiment, an authorization module 112 is provided. The authorization module 112 may be located remotely from the vehicles 102 as depicted in FIG. 1, or it may be located within the vehicle 102, at the company-A 100A, at the third parties 110, etc. In one embodiment, the authorization module 112 represents an entity that is capable of receiving information pertaining to a vehicle's 102 fuel capacity, and providing electronic authorization to purchase a quantity of fuel up to the vehicle's 102 fuel capacity. In one embodiment, the authorization may be indicated to the driver of the vehicle 102, but may also be provided to a machine(s) responsible for dispensing the fuel, such as a fuel pump. In this manner, the fuel pump may disallow further fuel dispensing after the fuel quantity corresponding to that which was authorized has been dispensed.

Figure 2:
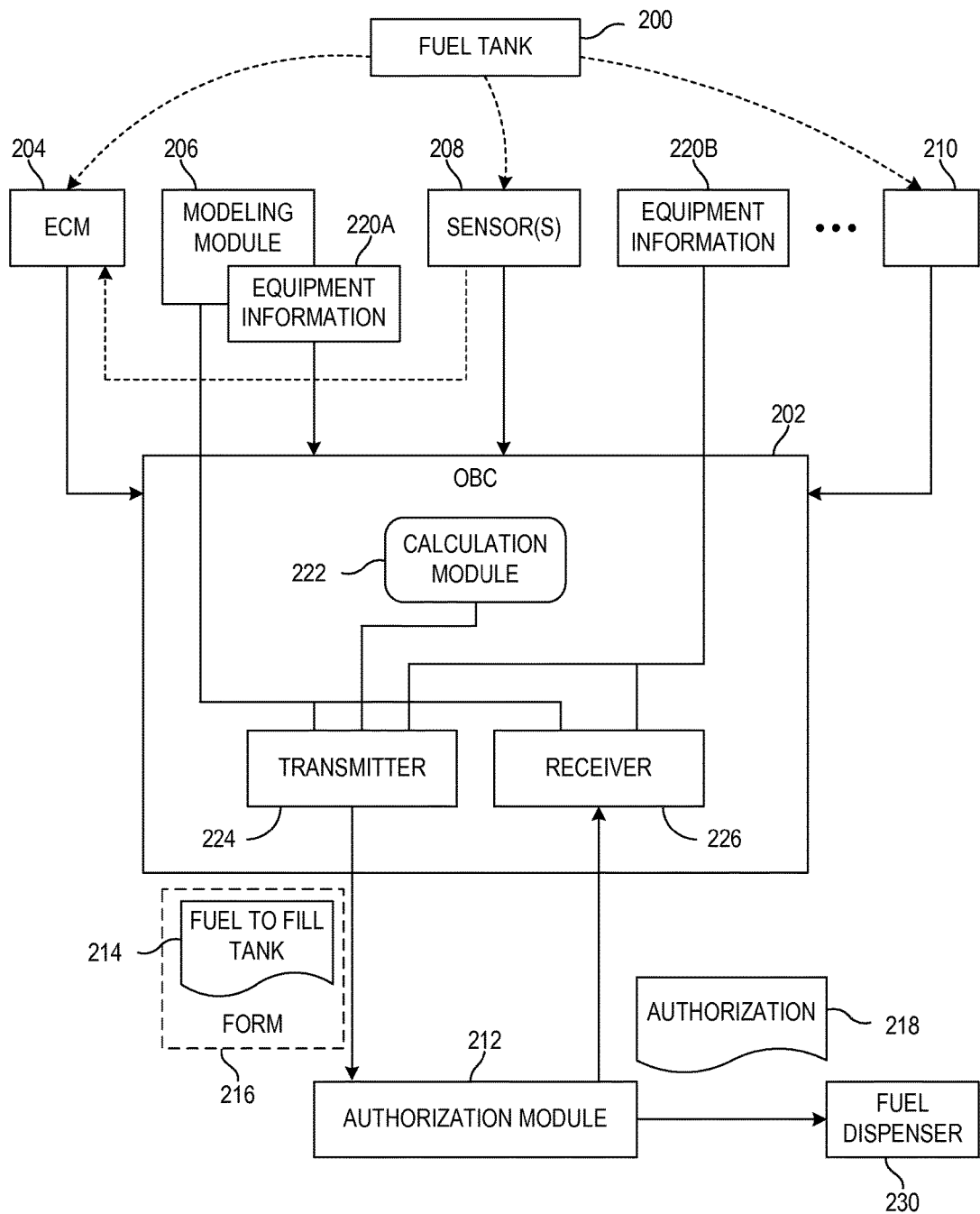
FIG. 2 is a block diagram illustrating a representative manner for seeking authorization for fuel purchases in accordance with the disclosure.

FIG. 2 is a block diagram illustrating a representative manner for seeking authorization for fuel purchases in accordance with the disclosure. In the illustrated embodiment, it is assumed that at least the fuel tank 200 and the onboard computer 202 are provided in the vehicle. Any one or more of the engine control module (ECM) 204, modeling module 206, sensor(s) 208, and/or other equipment 210 are capable of assisting in the fuel authorization process may be provided on the vehicle.

In the illustrated embodiment, the authorization module 212 will ultimately receive an indication 214 of a quantity of fuel to fill the fuel tank 200. The indication 214 may be provided by way of an electronic request form 216 or otherwise. If approved, the authorization module 212 will provide an authorization 218 that will enable a fuel purchase up to an authorized quantity. In one embodiment, the authorized quantity corresponds to the amount that would be required to substantially fill the fuel tank 200.

More particularly, in one embodiment an ECM 204 is capable of providing a current fuel tank level, which may be provided in gallons, liters, percentage of full tank capacity, etc. For example, the fuel tank 200 may include one or more tank level sensors 208 that can provide a current tank level to the ECM 204 and ultimately to the OBC 202. Additionally or alternatively, one or more sensors 208 may be provided in the fuel tank 200 to directly provide fuel tank level data to the OBC 202.

In another embodiment, a local or remotely located modeling module 206 may provide a calculated current fuel tank level. For example, the modeling module 206 may use any of distances traveled (e.g. via GPS coordinates, odometer readings, etc.), estimated fuel mileage, and/or other travel-related data to calculate an amount of fuel remaining in the fuel tank 200. In one embodiment, equipment information 220A may be known to the modeling module 206, such as the vehicle's maximum or total tank capacity. Equipment information 220B may be provided independently of any modeling module 206, such as from any third party, or locally stored for access by the OBC 202.

By way of any of these representative manners or other manners of obtaining the fuel level of the fuel tank 200, and the total/maximum fuel capacity of the fuel tank 200 for the particular vehicle at issue, OBC 202 can calculate how much fuel would be required to fill the fuel tank 200. In one embodiment, the calculation module 222 at least receives as input the fuel level (as an absolute value, percentage of complete fill, or other representation of fuel level) of the fuel tank 200, and the total fuel capacity of the fuel tank 200 as provided by way of equipment information 220A/220B. The result, which corresponds to a current fuel tank capacity (i.e. the amount of fuel to fill the fuel tank 200), is provided via a transmitter 224 to the authorization module 212. In one embodiment, the transmission via the transmitter 224 is a wireless transmission, as one embodiment involves the authorization module 212 being located remotely from the vehicle and OBC 202. The calculation result is embodied in an authorization request, which is depicted in FIG. 2 as the "fuel to fill tank" request 214.

The authorization module 212 may be provided at any authorization entity, such as, for example, a fuel vendor, a company on-site bulk fuel area, a mobile communications company, etc. A resulting authorization notification 218 may be received by receiver 226 and OBC 202 to notify the driver of the vehicle that authorization has been approved. Additionally or alternatively, the authorization 218 from the authorization module 212 is ultimately provided to the fuel dispenser 230 to limit the amount of fuel that can be dispensed to what the fuel tank 200 is currently capable of receiving as a result of having expended some fuel in the fuel tank 200. In this manner, only the amount of fuel required to fill the fuel tank 200 is authorized for purchase in connection with this particular fuel purchase transaction. If the fuel tank 200 is indeed filled, limiting the fuel that is dispensed to only that which the fuel tank 200 can hold prevents additional fuel from being dispensed in an unauthorized fashion. For example, if the vehicle fuel tank 200 is filled, the person dispensing the fuel would be unable to dispense additional fuel into another vehicle, a portable container, etc.

Figure 3:
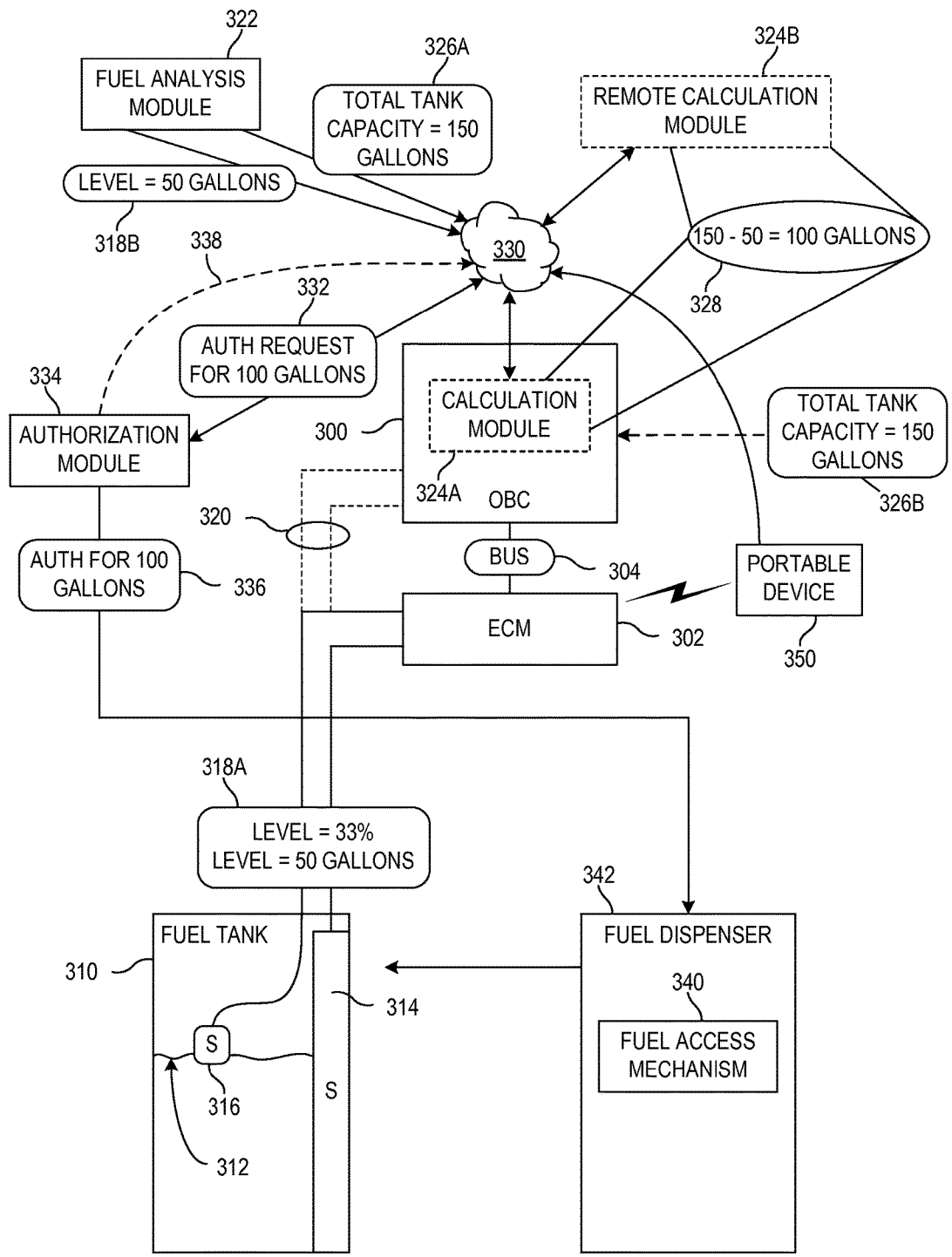
FIG. 3 is a block diagram illustrating an example in which authorization for a fuel purchase may be effected.

FIG. 3 is a block diagram illustrating an example in which authorization for a fuel purchase may be effected. This embodiment assumes that an onboard computer (OBC) 300 and an engine control module (ECM) 302 are on board the vehicle which is to be fueled. A bus 304, such as a SAE J1939 bus, may be coupled between the ECM 304 and the OBC 300, although any interface may be used.

The fuel tank 310 in FIG. 3 is depicted as having a fuel level 312. The fuel level 312 may be detected in any manner, such as by way of a level sensor 314, a float sensor 316, etc. The fuel level may be provided as a raw data value that can be processed by the ECM 302. For example, the fuel tank level 312 may be at 33% of full capacity, or having approximately 50 gallons remaining, as noted at block 318A. The raw data associated with this fuel level 312 may be obtained by the ECM 302 and put into a tank capacity percentage (e.g. 33%), absolute value (e.g. 50 gallons), or otherwise. In one embodiment, the OBC 300 may incorporate processing features of the ECM 302 such that the OBC 300 receives and processes the raw data from the fuel tank 310, as depicted by dashed lines 320.

It should be noted that alternative manners of receiving the fuel tank 310 level 312 may also or alternatively be used, such as by receiving a calculated fuel tank level 312 from a fuel analysis module 322 that can model fuel consumption given proper inputs such as distance traveled, estimated fuel mileage, RPMs and/or speed traveled, etc. This is depicted at block 318B which depicts that the fuel tank level indicates approximately 50 gallons remaining in the fuel tank 310. The fuel tank level 312 may be provided in any manner, and those depicted in FIG. 3 are merely representative.

A calculation module 324A may be provided by the OBC 300 or other computing device on the vehicle. The calculation module 324A receives at least the fuel tank level 312 as provided by the ECM 302, fuel analysis module 322, etc. The calculation module 324A also receives equipment information, such as equipment master information, including the total fuel tank capacity for the vehicle purchasing the fuel. For example, in the illustrated embodiment, it is assumed that the total tank capacity 326A of the truck purchasing the fuel is approximately 150 gallons, which can be provided by the fuel analysis module 322. Alternatively, the total tank capacity 326B may be provided by any remote entity, or by the OBC 300 itself if it was preprogrammed to store its host vehicle's fuel tank 310 capacity. The total tank capacity 326A/326B may be provided in any manner, and those depicted in FIG. 3 are merely representative.

Given at least a particular fuel tank level 318A/318B, and the total tank capacity 326A/326B, the calculation module 324A can calculate the remaining capacity of the fuel tank 310—i.e. the amount of fuel it would take to fill the fuel tank 310. In one embodiment, the fuel level 312 is provided (as shown at block 318A) to the ECM 302 as raw data, as a digital number between 0-255 which can be provided by an 8-bit byte. In one embodiment, either the ECM 302 or the calculation module 324A can convert the value to a percentage of full tank capacity. The basis of this calculation is that there are approximately 2.55 bits of information for each percent in 100% of fuel capacity (since there are 255 bits representing the fuel level 312), and thus for each 1 bit of change, there is approximately a 0.4 change in percentage (i.e. 1 ÷2.55≈0.4) of current fuel tank level 312. Thus, either the ECM 302 or calculation module 324A can multiply the raw data value between 0 and 255 by 0.4 to obtain the percentage of the fuel tank 310 that is occupied by fuel. The calculation module 324A, which may be implemented with a processor associated with the OBC 300, can then multiply the calculated percentage by the total tank capacity 326A/326B. For example, if the fuel tank 310 is one third full, 33% times a total tank capacity of 150 gallons indicates that 50 gallons are in the fuel tank 310. The calculation module 324A can then determine the current fuel tank "capacity" (i.e. the amount of fuel that will fill the fuel tank 310) by determining the difference between the total tank capacity 326A/B (which is 150 gallons in the present example) and the number of gallons in the fuel tank 310 (which is 50 gallons in the present example) as shown at block 328. Thus, it has been determined that the fuel tank 310 is capable of receiving as much as 100 gallons of fuel. As described below, it is this quantity that is requested for fuel purchase authorization. It should be noted that this example is provided merely for purposes of illustration, as the tank level information may be provided in any desired format.

It should be noted that the calculations may be performed elsewhere than the OBC 300. For example, a remote calculation module 324B may be provided to perform the calculation of remaining fuel tank 310 capacity, which is accessible to the OBC 300 via one or more networks 330. For example, a central office, mobile communications company and/or other entity may host a remote calculation module 324B where such calculations may be performed. Such an embodiment may be useful where the OBC 300 provides communications functionality but little or no processing functionality, or where complex conversions are required to address unique, vehicle-specific configurations, such as unequal tank sizes which may require non-linear calculation processes.

The OBC 300 may then provide the communication functionality to transmit an authorization request 332 for what has been calculated as the current fuel tank capacity for that vehicle, which was 100 gallons in the present example. For example, the request 332 may be sent over one or more networks 330 which may include any one or more of cellular networks, wireline networks, satellite networks, peer-to-peer networks, etc. In one embodiment, a digital request form is completed by the driver of the vehicle where the current fuel tank capacity can be provided on the form by the OBC 300. In any desired manner, the authorization request 332 is provided to an authorization module 334.

In one embodiment, the authorization module 334 is provided by a fuel card vendor or other entity that can in some manner control the quantity of fuel that is dispensed at a fuel pump. For example, a fuel card vendor represents one entity that can control a quantity of fuel dispensed, such as limiting a card holder to a daily limit, transaction limit, etc. The present disclosure describes a manner in which a fuel card vendor, credit card vendor, RFID swipe card vendor or the like can limit fuel to be dispensed based on fuel tank 310 capacity rather than merely financial limits. Other entities can serve as the authorization module, such as the fueling station/pump itself, which may be provided as a service or for a fee. In such an example, the fueling station/pump can receive the authorization requests 332, and terminate fuel dispensing when the authorized fuel quantity has been reached. Other hosts for the authorization module 334 may be used, and those described herein are described for purposes of illustration and example only.

In the illustrated embodiment, the particular driver/vehicle has been authorized for 100 gallons as shown at block 336. In one embodiment, a notification of the authorization is also provided back to the OBC 300 via the one or more networks 330 as depicted by line 338, which may notify the vehicle driver of the authorization that has been granted. The authorization 336 may be received by a fuel access mechanism 340. The fuel access mechanism 340 could be, for example, a module within the fuel pump or other fuel dispenser 342 that coordinates with a fuel card vendor and approved quantity of fuel that may be dispensed. When the approved quantity of fuel has been dispensed, the fuel access mechanism 340 can cause the fuel pump to stop dispensing fuel. If all of the fuel was dispensed into the vehicle's fuel tank 310, the fuel tank 310 should be substantially full. Post-transaction verifications may be conducted to determine whether all of the authorized fuel was dispensed into the fuel tank 310, as described more fully below.

In one embodiment, the ECM 302 may provide the fuel tank level 312 wirelessly, such as via a short-range wireless protocol (e.g. Bluetooth, WLAN, peer-to-peer networking, etc.). A portable device 350, such as a smart phone or other mobile communication device, could host an application or access a website to wirelessly receive the tank level 312, receive via the cellular network the relevant total tank capacity 326A/B (or have the total tank capacity for a particular vehicle stored in the portable device 350), and perform the current fuel tank capacity calculation itself. In such case, the portable device 350 can send the authorization request 332 via the network(s) 330 to the authorization module 334, and in some cases receive the notification of whether authorization was successful as shown by dashed line 338. Thus, embodiments of the fuel purchase authorization described herein may involve the use of portable devices 350 where at least the fuel tank 310 level 312 and total tank capacity 326A/B for the particular vehicle being fueled can be obtained.

Figure 4A:
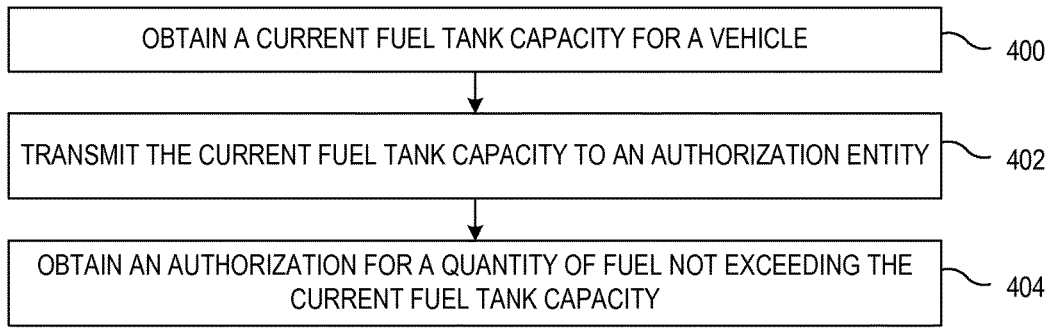
FIG. 4A is a flow diagram illustrating a representative method for preventing fuel theft through fuel purchase authorizations corresponding to the remaining capacity in the vehicle's fuel tank.

FIG. 4A is a flow diagram illustrating a representative method for preventing fuel theft through fuel purchase authorizations corresponding to the remaining capacity in the vehicle's fuel tank. As shown at block 400, a current fuel tank capacity is obtained for the vehicle. The current fuel tank capacity is transmitted 402 to an authorization entity. An authorization is obtained for a quantity of fuel not exceeding the current fuel tank capacity 404. In this manner, only an amount of fuel capable of filling the vehicle's fuel tank will be authorized for dispensing.

Figure 4B:
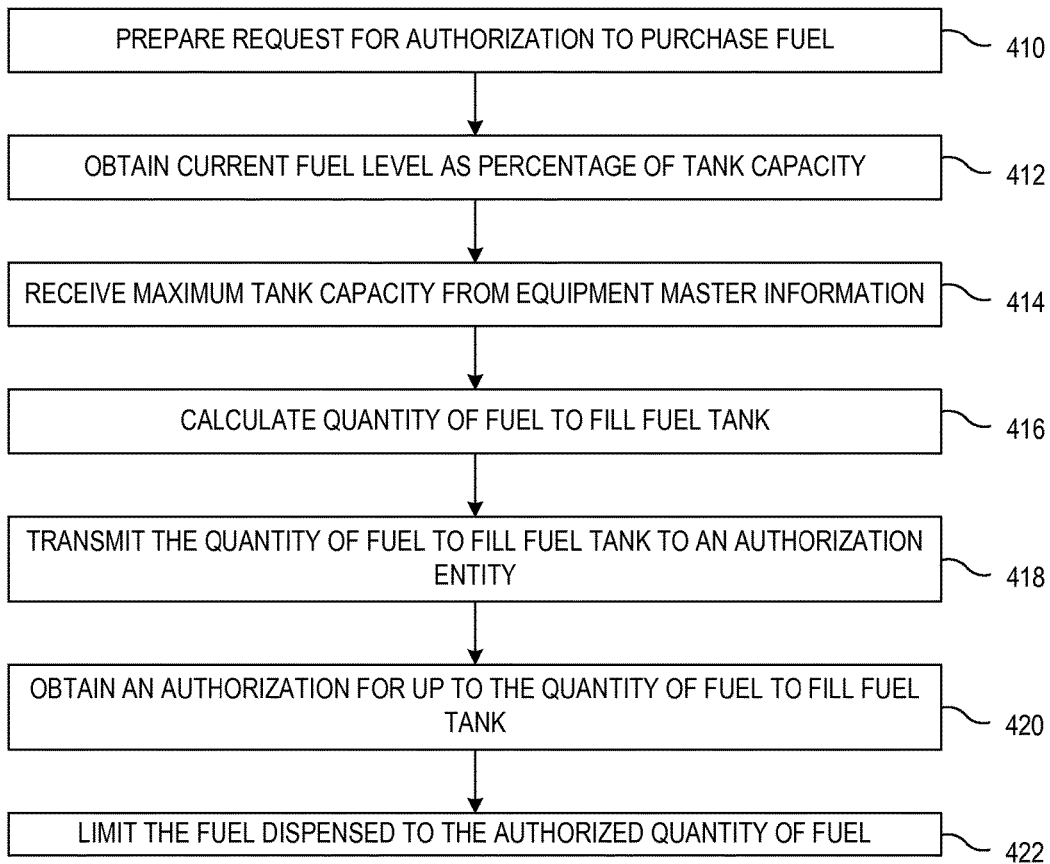
FIG. 4B is a flow diagram illustrating another representative manner for authorizing fuel purchases based on the remaining fuel tank capacity of a vehicle.

FIG. 4B is a flow diagram illustrating another representative manner for authorizing fuel purchases based on the remaining fuel tank capacity of a vehicle. In this embodiment, block 410 depicts that a request for authorization to purchase fuel is prepared. A current fuel level may be obtained 412 as a percentage of the total or maximum tank capacity. The maximum tank capacity associated with equipment master information is received 414, and based on at least the current fuel level and a maximum tank capacity the quantity of fuel required to fill the fuel tank can be calculated 416. This calculated quantity of fuel can be transmitted 418 to an authorization entity. In one embodiment, an authorization for up to the quantity of fuel needed to fill the fuel tank is obtained 420, and the fuel dispensed is limited 422 to correspond to the authorized quantity of fuel.

The representative examples described above in some cases assume a fuel tank in which the fuel level can be measured by a single fuel level sensor, and/or tracking and calculation, or other means. In one embodiment, however, the vehicle's tank may have a configuration that will involve a more complex, and in some cases tank-dependent, calculation of the quantity of fuel that could be added to the fuel tank at a given time. For example, a truck may have multiple fuel tanks, such as where a primary and auxiliary tank are provided. Depending on configuration characteristics such as fuel tank size, number of fuel tanks, whether the fuel tanks are connected, whether any fuel connection is open or valved and the like, the calculation of remaining tank capacity may change.

Figure 5A:
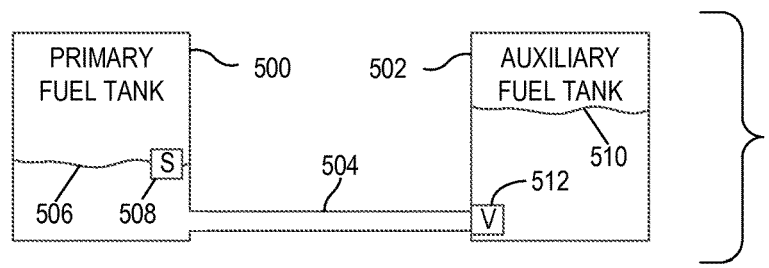
FIGS. 5A-5C are examples of fuel tank scenarios that illustrate how fuel tank calculations may change depending on the fuel tank configuration.
Figure 5B:
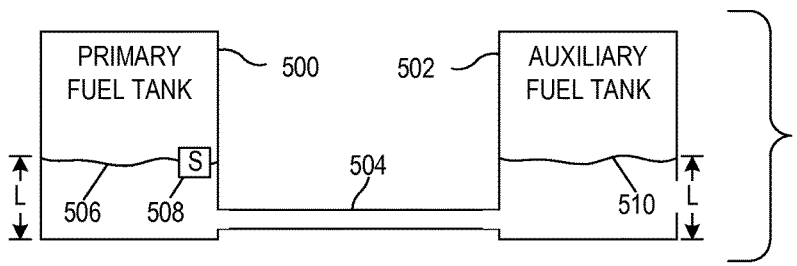
Figure 5C:
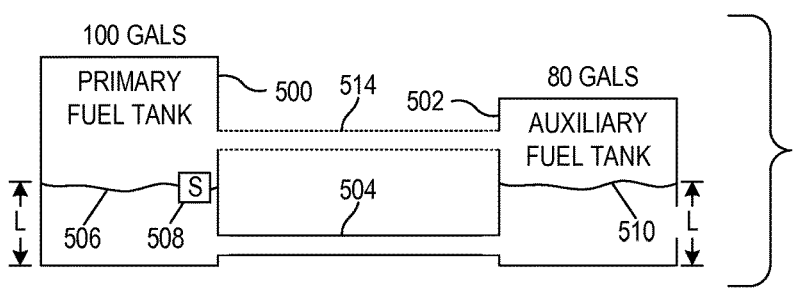

FIGS. 5A-5C are examples of fuel tank scenarios that illustrate how fuel tank calculations may change depending on the fuel tank configuration. FIG. 5A depicts a dual tank scenario where both a primary fuel tank 500 and auxiliary fuel tank 502 are used on a vehicle. The primary fuel tank 500 has a fuel level 506 that can be sensed by sensor 508. The auxiliary fuel tank 502 is connected to the primary fuel tank 500 by way of a flow-through line 504. In the example of FIG. 5A, the auxiliary fuel tank 502 includes a valve 512 that can controllably allow the fuel from the auxiliary fuel tank 502 to replenish the fuel in the primary fuel tank 500. As can be seen, if the valve 512 on the auxiliary fuel tank 502 is closed, the sensor 508 in the primary fuel tank 500 senses only the fuel in the primary fuel tank 500. If the valve 512 is open, the total fuel capacity is increased by the amount of the auxiliary fuel tank 502. The inclusion or exclusion of the auxiliary fuel tank 502 consequently makes a difference in how the remaining fuel capacity in the aggregate of the primary and auxiliary fuel tanks 500, 502 is calculated.

FIG. 5B is another example that illustrates how and auxiliary fuel tank 502 can impact the fuel tank readings in the primary fuel tank 500. In this embodiment, the flow-through line 504 is always open. Thus, the total amount of fuel in the aggregate of the primary and auxiliary fuel tanks 500, 502 changes the fuel calculation as the sensor 508 corresponds only to the fuel level 506 in the primary fuel tank 500. In this embodiment, the level "L" of the fuel is substantially the same in each tank, yet the amount of fuel that could be added to the aggregate of the tanks 500, 502 is greater than what the sensor 508 believes to be available in only the primary fuel tank 500. Again, the calculation to determine remaining fuel capacity needs to take into consideration the auxiliary fuel tank 502 and flow-through line 504.

FIG. 5C illustrates another example, where the primary and auxiliary fuel tanks 500, 502 are of different sizes. This too, results in a different calculation of how much fuel can be added to the aggregate tanks. It should also be recognized that the physical location of the flow-through line 504, 514 may also make a difference in the calculation if a single sensor 508 is used in one of the tanks such as the primary fuel tank 500. In the example of FIG. 5C, the standard equation of total tank capacity—(tank level %×total tank capacity) would understate actual gallons. Assuming a drawdown of 20 gallons in the primary fuel tank 500, the standard equation would result in 180−(80%×180)=180−144=36 gallons that can be added. However, this is inaccurate where the additional 80 gallons of the auxiliary fuel tank 502 is present, as the actual fuel would be 180 gallons−(primary tank at 80%-80 gallons+auxiliary tank at 80 gallons)=180−160=20 gallons that can be added. Therefore, in such situations, the proper computation should be derived for use on that particular vehicle.

Figure 5D:
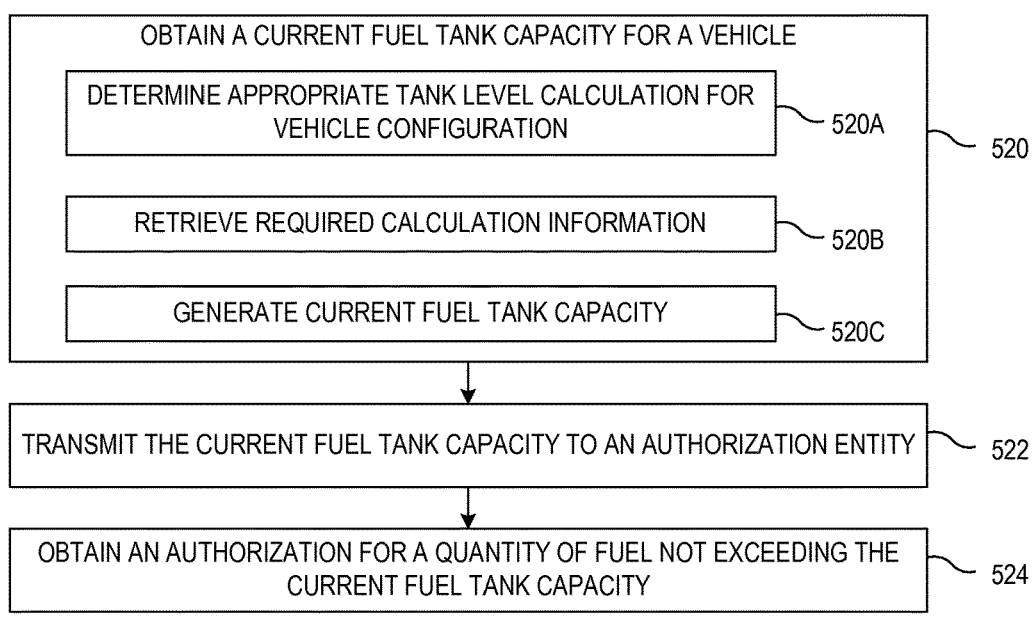
FIG. 5D is a flowchart that illustrates how a representative method may be adapted to consider various fuel tank configurations.

FIG. 5D is a flowchart that illustrates how a representative method may be adapted to consider various fuel tank configurations. In this example, a current fuel tank capacity can be obtained 520 for a vehicle. In one embodiment, this can be obtained by determining an appropriate tank level calculation for the vehicle configuration as shown at block 520A. This could be determined through an analysis of the particular fuel tank configuration, or could be retrieved from an entity that had predetermined this information. The required calculation information can be retrieved 520B, for example, this information may involve a formula, lookup table or other information that can be obtained in various manners. For example, information may be retrieved from a remote source, such as an entity having access to equipment master information, VIN decoder information, etc., any of which could associated such a formula with the type of vehicle. In some cases, fuel tanks may be added aftermarket, in which case a formula can be determined for the particular configuration, and stored locally on the OBC or remotely. Based on the calculation information, the current fuel tank capacity can be generated as shown at block 520C. The method may then involve continuing on with transmitting the current fuel tank capacity to an authorization entity 522, and obtaining an authorization for a quantity of fuel that does not exceed the current fuel tank capacity as shown at block 524.

Figure 6A:
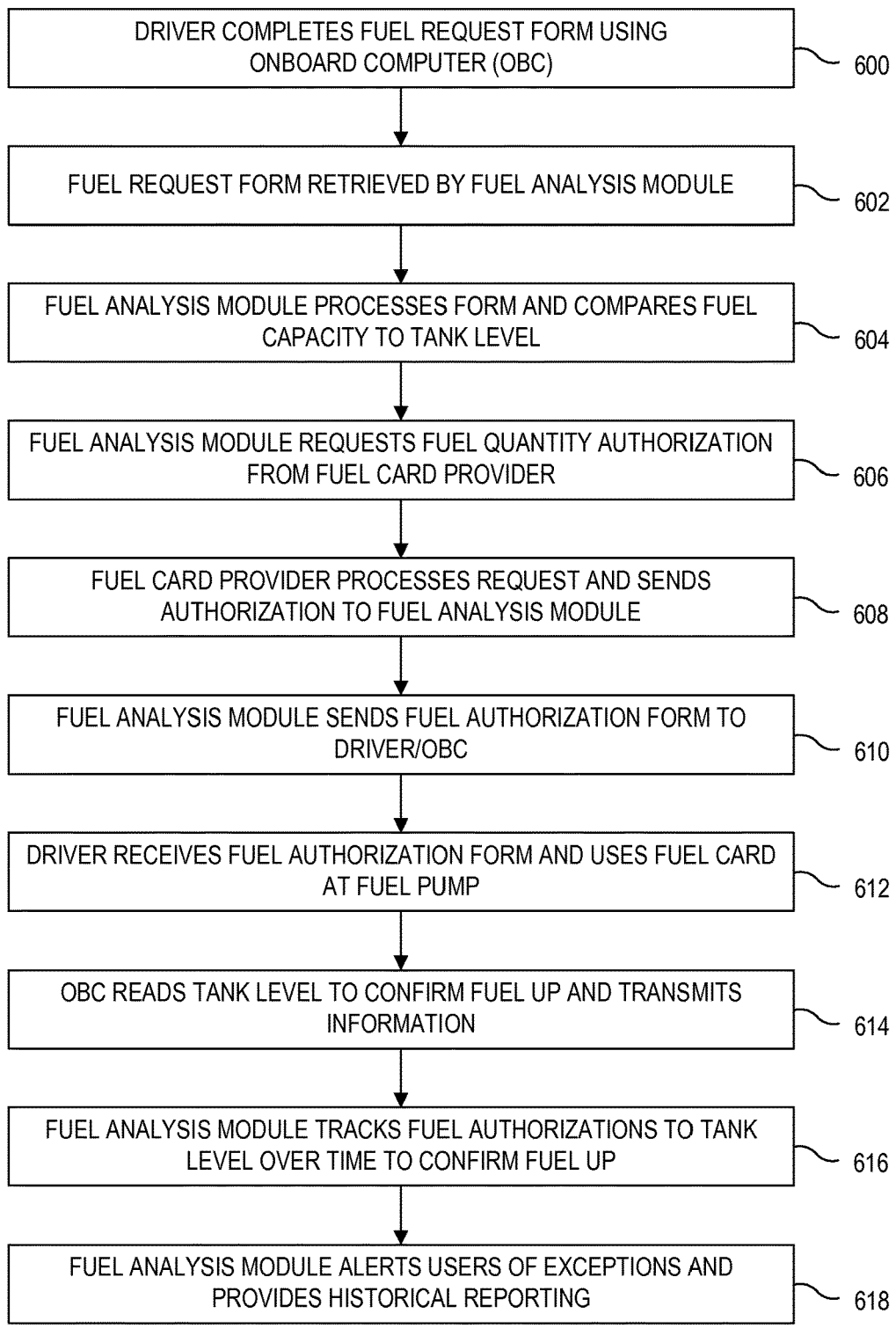
FIGS. 6A and 6B depict alternative embodiments of other representative manners for authorizing fuel purchases to avoid fuel purchases that exceed what is needed to fill the vehicle's fuel tank.
Figure 6B:
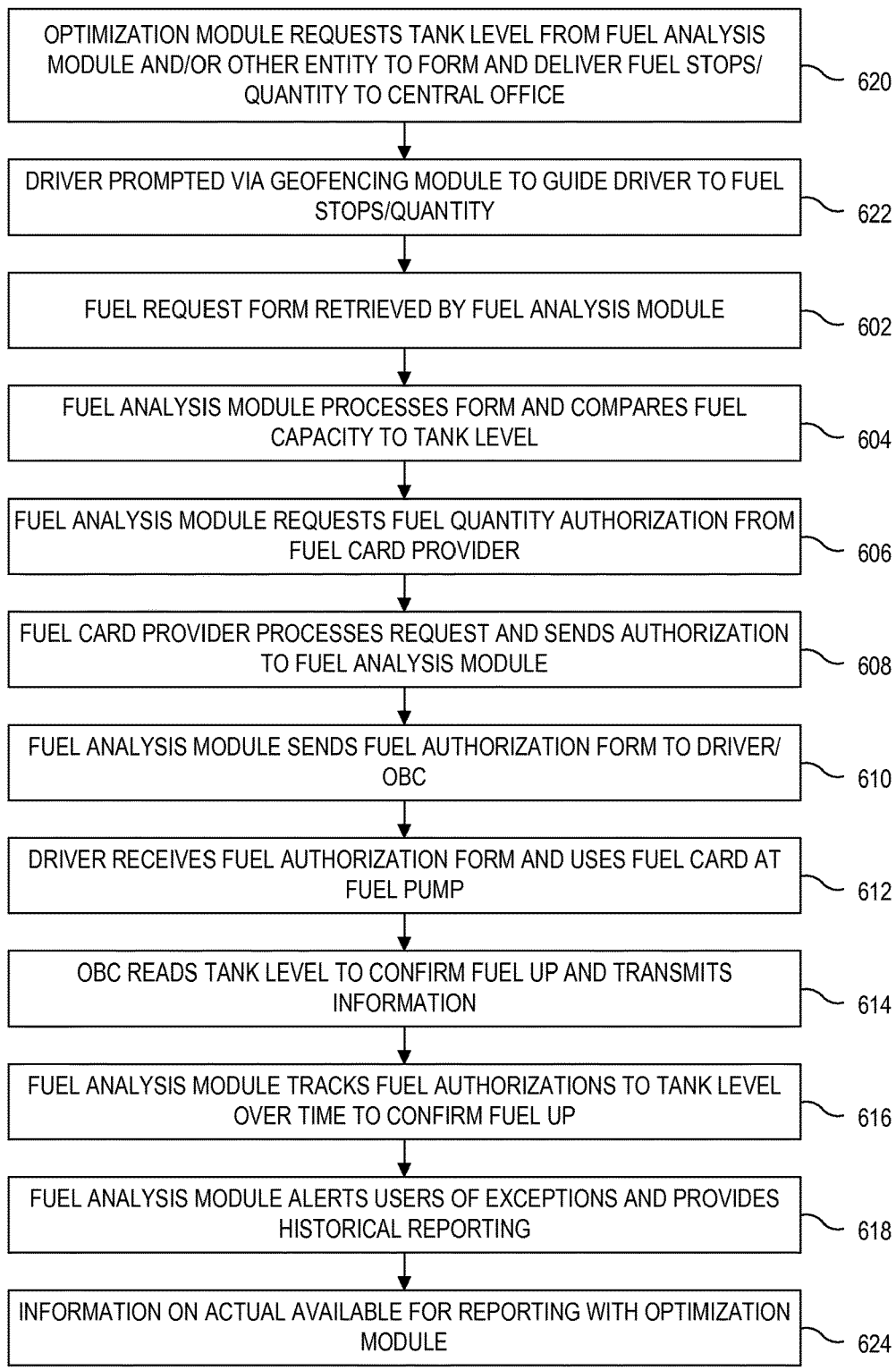

The flow diagrams of FIGS. 6A and 6B are alternative embodiments of yet other representative manners for authorizing fuel purchases to avoid fuel purchases exceeding what is needed to fill the vehicle's fuel tank. Like reference numbers are used in FIGS. 6A and 6B where appropriate.

Referring first to FIG. 6A, block 600 shows that the vehicle driver completes a fuel request form using the onboard computer. FIG. 6A thus is directed to an embodiment where preparation, transmission or other activity associated with the driver's fuel request form initiates the fuel authorization process. However, this is merely an example, as various other actions may initiate the fuel authorization process. For example, the process could involve continuously tracking and transmitting tank level, and at the time the driver pulls up to a fuel pump at a service station or company bulk fuel site, the fuel authorization can include the current fuel tank capacity in the calculation loop. In other words, the amount of fuel that could be added to the fuel tank can be periodically, occasionally or otherwise repeatedly transmitted to a site where fueling will occur. GPS coordinates, driver ID, RFID tags, code entry, and/or any other process could then initiate the calculation process for that vehicle using the current fuel tank capacity that has previously been transmitted. In other embodiments, the process may be initiated by the driver swiping a fuel card, GPS coordinates, credit card access, driver ID, code entry, RFID tags, etc. Thus, any manner of initiating the process and/or providing the current fuel tank capacity can be implemented.

At block 602, the fuel request form is retrieved by a fuel analysis module. In one embodiment, the fuel analysis module is provided in connection with a statistical modeling module, where data for use in modeling and analysis is received from, for example, the vehicles, third party vendors, and/or mobile communications companies. In such a statistical modeling module, data fields can be reviewed, such as through evaluation of data quality and usability, identification of missing or irregular values, and the creation of uniform values. A statistical analysis can be executed, where significant categorical variables are identified, such as equipment type, fleet type, division, etc. A model with costing elements may be created. For example, a model for each significant categorical variable may be generated, and the model may be applied to operational metrics process for items such as fuel theft, non-performing vehicles, driver alerts, etc.

Figure 7:
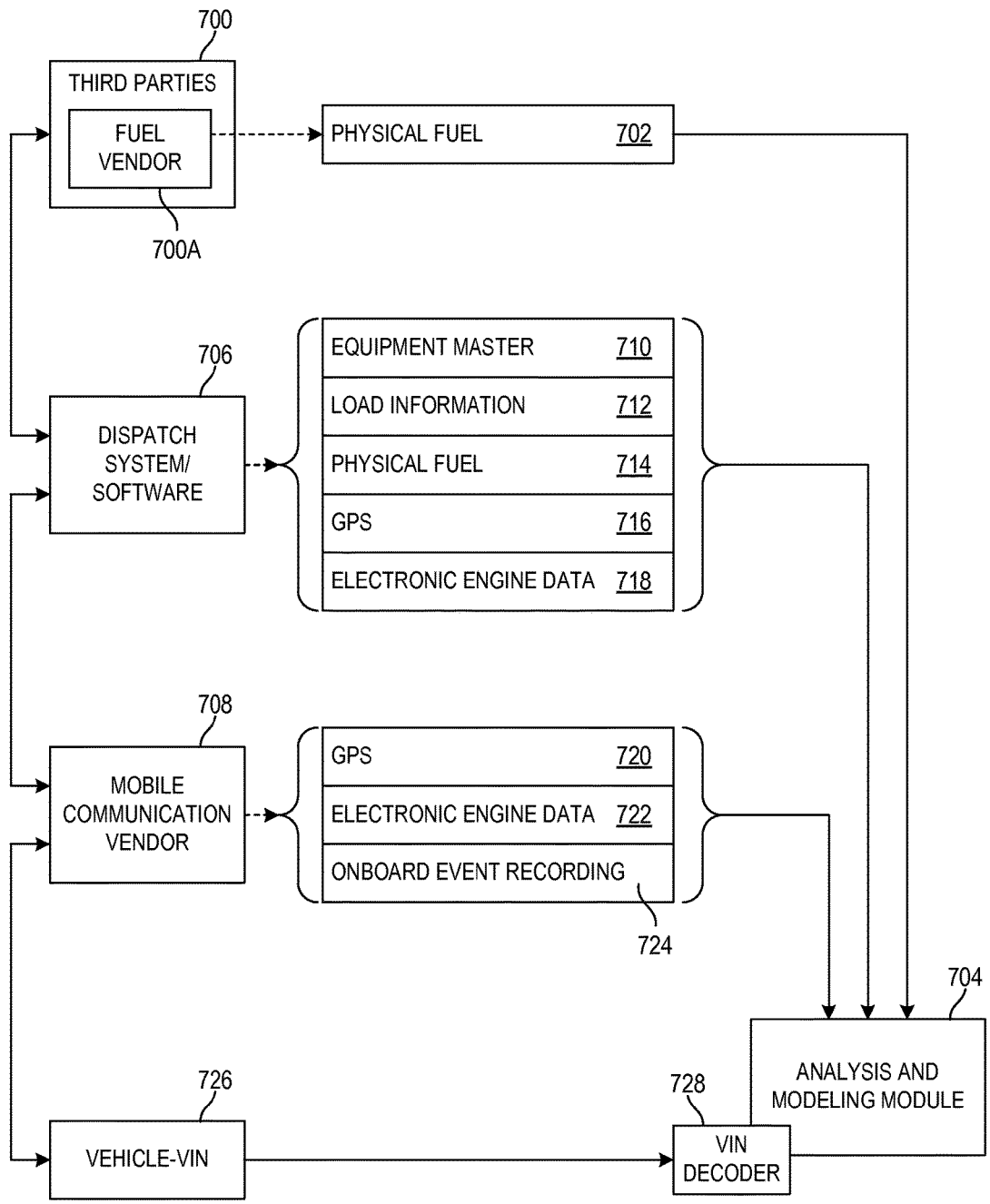
FIG. 7 is a diagram illustrating representative manners in which data may be obtained for use in analyzing and modeling the data in desired manners.

Referring to FIG. 7 before returning to FIG. 6A, an example of the type of data associated with such a fuel analysis module is described. FIG. 7 is a diagram illustrating representative manners in which data may be obtained for use in analyzing and modeling the data in desired manners. As described below, information such as fuel purchases, truck (or other vehicle) equipment information, load information, fuel consumption as determined by onboard ECM, GPS or other tracking data, onboard event recording and other data may be obtained by one or more sources. FIG. 7 illustrates exemplary sources in which such data may be obtained.

A first data source includes third parties 700, such as a fuel vendor 700A. A fuel vendor 700A can provide credit, such as in the form of a credit card, that can be used by the truck driver to buy fuel. When fuel is purchased using a fuel vendor card, the fuel vendor may retain information such as the quantity of fuel purchased, the location of the purchase, cost of the fuel purchased, date and time of the purchase, etc. This data can provide information relating to the actual or physical fuel usage 702 by the particular truck. This information can be provided directly to a fuel analysis and modeling module 704, or may be provided by way of another entity such as a company's dispatch system/software 706 if the dispatch software has an interface to the fuel vendor 700A.

Another exemplary data source is from a company's dispatch system 706. The dispatch system 706 typically includes dispatch software to enable the company to track their trucks and/or hired owner-operator drivers. Such systems typically track the location of the trucks, as well as whether each truck is loaded, load weight, and so forth. In one embodiment, an interface is provided to the dispatch system software 706 to enable other systems, such as the analysis and modeling module 704 and/or other systems such as mobile communication vendors 708, to obtain the information pertaining to the company's trucks or other vehicles. The company may collect information from their trucks, such as equipment master information 710, which provides truck and/or engine type, model, year, whether an auxiliary power unit (APU) is utilized in the truck, total fuel tank capacity for the particular vehicle, and/or any other information relating to the vehicle itself. This can be obtained whether the company or an independent driver owns that particular vehicle. It should also be noted that information such as the equipment master 710 can be obtained from any entity or source. For example, where no dispatch integration exists with a dispatch system 706, equipment master 710 information can be accepted from clients, such as via a spreadsheet or otherwise.

Other representative information that may be obtained via an interface or otherwise from a company's dispatch system 706 includes load information 712, which identifies at what times the particular truck was empty or under load, and what the load weight is when under load.

Still other information, such as fuel information 714, GPS or other location information 716 and electronic engine data (e.g. ECM data) 718 may also be provided by a company's dispatch system. For example, some companies may utilize a fuel vendor, and obtain information regarding fuel purchases directly from their fuel vendor. In such cases, fuel 714 purchase information may be obtained from the dispatch system 706, or alternatively may be obtained directly from the fuel vendor 700A. Similarly, GPS or other location information 716 for the company's trucks may be obtained from the dispatch system 706, or from other parties such as a mobile communication company 708. Electronic engine data 718 may also be obtained via the dispatch system 706 or from another party such as a mobile communication vendor 708. The electronic engine data 718 may include any information obtained by the particular truck's ECM or other similar control unit, such as the quantity of fuel consumed and the number of miles traveled to consume that fuel, idle time, RPM thresholds, etc.

Information may alternatively, or additionally, be provided by way of a mobile communication vendor(s) 708. Companies having a fleet of vehicles, or independently owned vehicles may utilize services of a mobile communication vendor 708 such as PeopleNet™ Communications Corporation. With onboard computing on such vehicles to obtain information such as GPS or other location data 720, electronic engine data 722, onboard event recording (OER) information 724 and the like, a mobile communication vendor 708 can collect information that can then be obtained by the analysis and modeling module 704. The OER information may be obtained from event recording at the vehicle, such as recording events such as hard braking or sudden stop events, exceeding RPM thresholds, exceeding speed thresholds, and the like.

As noted above, information obtained by the analysis and modeling module 704 may be vendor-direct, such as from a fuel vendor 700A, mobile communication vendor 708, etc. Other or overlapping information may be dispatch-direct, such as that provided by a dispatch system 706. The information may be obtained via an interface available to the third parties 700, dispatch system 706, and mobile communication vendor 708. For example, the analysis and modeling module 704 may host a web or other network server that provides an online interface to the various data sources. In another embodiment, software utilized by such entities may be modified to provide the information to the analysis and modeling module 704.

In some cases, the fleet company or independent driver does not have a dispatch system 706, or does not have a dispatch system 706 that is integrated with the analysis and modeling module 704 such that the information can be provided to the module 704. In such a case, equipment master information 710 is not available, and the information is obtained using the vehicle identification number (VIN) 726 for the trucks or other vehicles of interest. For example, the customer can provide a list of VINs 726 such as a tractor-VIN list. The VINs can be processed via a VIN decoder 728 which provides equipment master information, including total fuel tank capacity for the particular vehicle, for the trucks identified by the list 726.

In one embodiment, each piece of the information to be utilized at the analysis and modeling module 704 is obtained from a respective one of the data sources, rather than obtaining the same information from multiple data sources. For example, if physical fuel usage 702, 714 is available via both a fuel vendor 700A and a dispatch system 706, it may be obtained from just one of the sources, although it could be obtained from both. Similarly, if a company's fleet utilizes a mobile communication vendor 708 that is privy to the GPS information 720 and electronic engine data 722, then that information 720, 722 may be utilized rather than obtaining the GPS data 716 and electronic engine data 718 from a dispatch system 706 or other data source. The desired information can be obtained from any one or more of the data sources available to the analysis and modeling module 704.

As shown in the example of FIG. 7, various information may already be available at the analysis and modeling module 704, which may be used as the fuel analysis module of FIG. 6A. Data such as the equipment master 710, electronic engine data 718/722 and or other information may be provided by the analysis and modeling module 704 and/or the third parties 700, dispatch system/software 706, mobile communication vendor 708, etc. These entities 700, 704, 706, 708 are collectively referred to as the fuel analysis module for purposes of FIGS. 6A and 6B, as any or a combination of these entities may have access to desired information and/or be able to perform desired functions.

Returning now to FIG. 6A, the illustrated embodiment involves retrieving the fuel request form by a fuel analysis module as shown at block 602. The fuel analysis module can process 604 the form and compare the fuel capacity to the tank level. For example, where the fuel analysis module already includes equipment master information 710, such as the total fuel capacity of the fuel tank for that vehicle, that data may be obtained from the fuel analysis module. As previously noted, the fuel tank capacity or other equipment master information 710 can be obtained from the analysis and modeling module 704, dispatch system/software 706, or other entity described in connection with FIG. 7.

In one embodiment, the fuel analysis module can request the fuel quantity authorization from, for example, a fuel card provider as shown at block 606. At block 608, the fuel card provider processes the requests, and sends the appropriate authorization back to the fuel analysis module. The fuel analysis module can send 610 the resulting fuel authorization form to the driver by way of the OBC. The driver may receive the fuel authorization form, and use his/her fuel card at the fuel pump as shown at block 612.

In one embodiment shown at block 614, the onboard computer may read the tank level after the fuel has been dispensed to confirm that the fuel tank has been filled up. This confirmation may be transmitted to the fuel analysis module or elsewhere. In one embodiment, the confirmation that the fuel tank has been filled is sent to the fuel analysis module, which tracks 616 fuel authorizations to the fuel tank level over time to confirm fuel up. For example, the analysis and modeling module 704 of FIG. 7A may perform such tracking of fuel authorizations. The fuel analysis module may alert 618 users of exceptions, and provide historical reporting.

FIG. 6B illustrates some alternative options relative to the embodiment of FIG. 6A. Particularly, blocks 602-618 in FIG. 6B correspond to those of FIG. 6A, and are therefore labeled as they were in FIG. 6A. However, FIG. 6B further includes an optimization embodiment where preferred routes and/or pre-authorized fuel stations may become part of the authorization analysis. For example, optimized routes for a particular truck or other vehicle from point A to point B may involve preferred fueling stations in which the driver is expected to use. These fueling facilities may be based on the distance driven, where an anticipated fueling stop is planned for an area that may have better fuel prices, an agreement for fuel discounts with the truck/fleet, fewer state fuel taxes, bathing facilities, etc. Thus, the embodiment of FIG. 6B introduces location as a variable in the authorization process. For example, the authorization process may consider not only the current fuel tank capacity for a vehicle, but also whether the fuel is being purchased at a designated or otherwise preferred fueling station or location. Thus, in one embodiment, the "permission" to purchase an authorized quantity of fuel is also dependent on whether the vehicle is fueling at a particular fueling station.

FIG. 6B illustrates such a location-based embodiment. At block 620, and optimization module may request the fuel tank level from the vehicle and/or the fuel analysis module and/or other entity to form and deliver fuel stop locations and gallons required to fill the fuel tank. Such a request may be made to a central office of the company, a communications entity, or other entity. In one embodiment, the request is sent to a mobile communication vendor such as People-Net™ Communications Corporation. In one embodiment, the driver is prompted via a geofencing module to guide the driver to the proper fuel stops and authorized quantity of fuel for purchase. When at the correct location, a fuel request form may be retrieved at block 602, and the process may continue similarly to blocks 602-618 described in connection with FIG. 6A. In one embodiment shown at block 624, information regarding actual fuel purchases and locations are made available for reporting with optimization module as well.

As described above, block 614 depicts an embodiment where the onboard computer reads the fuel tank level after the authorized fuel quantity has been dispensed, in order to confirm that the fuel tank is full as a result of dispensing the authorized fuel quantity. This again is possible by obtaining the current fuel tank level, which theoretically should be "full" after the authorized fuel quantity has been dispensed into the fuel tank. Knowing this tank level facilitates validation that all of the dispensed fuel was dispensed into the fuel tank. For example, even though a driver/vehicle has been authorized for a quantity of fuel that should fill the fuel tank, the driver could avoid filling the fuel tank on his/her vehicle and instead dispense some of that authorized fuel into another vehicle or container. Thus, while in one embodiment the authorized fuel quantity authorizes the purchase of a quantity of fuel sufficient to fill the target vehicle's fuel tank, it assumes that all of the authorized quantity of fuel is dispensed into the vehicle's fuel tank. If the driver was to choose to dispense some of the authorized fuel into an unauthorized vehicle or container, the fuel tank of the vehicle subject to the fuel purchase would not be filled. Block 614 of FIG. 6A addresses this by reading the fuel tank level after the authorized fuel quantity has been dispensed. If the fuel tank level indicates that the fuel tank is full, then it can be safely assumed that all of the authorized quantity of fuel was dispensed into the vehicle that was supposed to receive the fuel. On the other hand, if the fuel tank level is not full, it may indicate that some of the fuel intended for the vehicle has been dispensed elsewhere. This validation can be performed at the point-of-sale, thereby making it possible to know that a driver dispensed at least some fuel in an unauthorized manner before the driver even leaves the fueling station.

Figure 8:
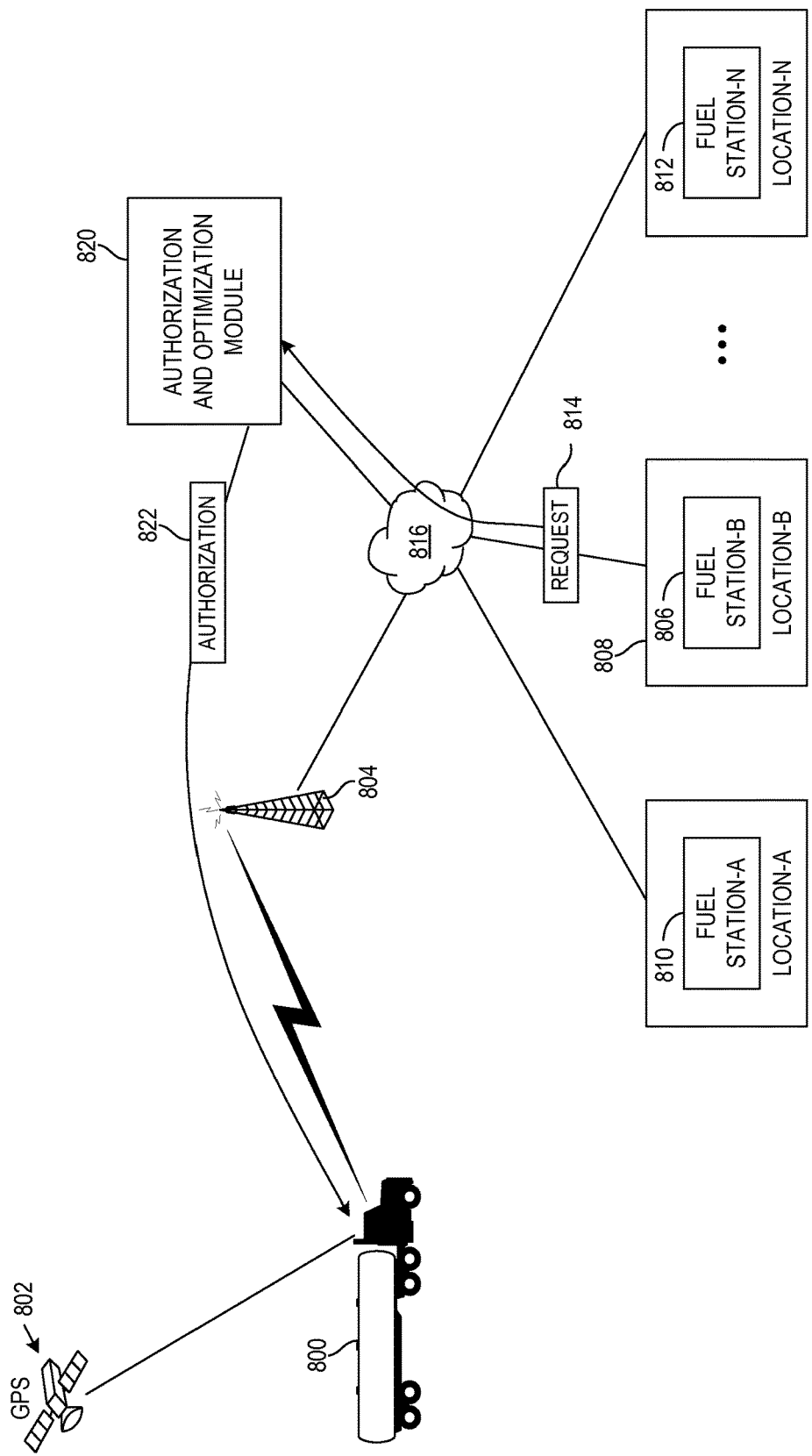
FIG. 8 is a block diagram depicting how particular fuel stations along a planned vehicle route are used in the authorization analysis.

An example of employing such optimization techniques is depicted in FIG. 8, which is a block diagram depicting how particular fuel stations along the truck 800 route are used in the authorization analysis. An example of FIG. 8, the vehicle is a truck 800 that is traveling along a route that can be determined by its coordinates such as via GPS satellite 802. The truck's 800 geographic location can be determined in other manners as well, such as cellular triangulation, or other manners. The truck 800 in this example includes an OBC (not shown) that can communicate via a cellular infrastructure including the base station 804 which represents the base station through which the truck 800 is currently communicating.

Assume for purposes of example that the truck 800 is associated with a fleet that has an agreement with fuel station-B 806 at location-B 808. When the truck 800 attempts to fuel at a different fueling station (e.g. fuel station-A 810 or fuel station-N 812), the authorization and optimization module 820 would not provide the authorization 822 to purchase the fuel if the optimization route failed to include these stations 810, 812. On the other hand, if the truck 800 is purchasing fuel at fuel station-B 806, it would send its request 814 to the authorization and optimization module 820 via the network(s) 816, resulting in the authorization 822 to purchase the fuel. Thus, in the embodiment of FIG. 8, both the current fuel tank capacity of the truck 800 and the location 808 and/or fuel station 806 represent inputs to the authorization and optimization module 820. It should be noted that whether the truck 800 is at an authorized fuel station may be determined in various manners, such as whether the location-B 808 is acceptable based on GPS readings, or whether the fuel station 806 is an approved fuel station based on fuel card or otherwise, etc.

Figure 9:
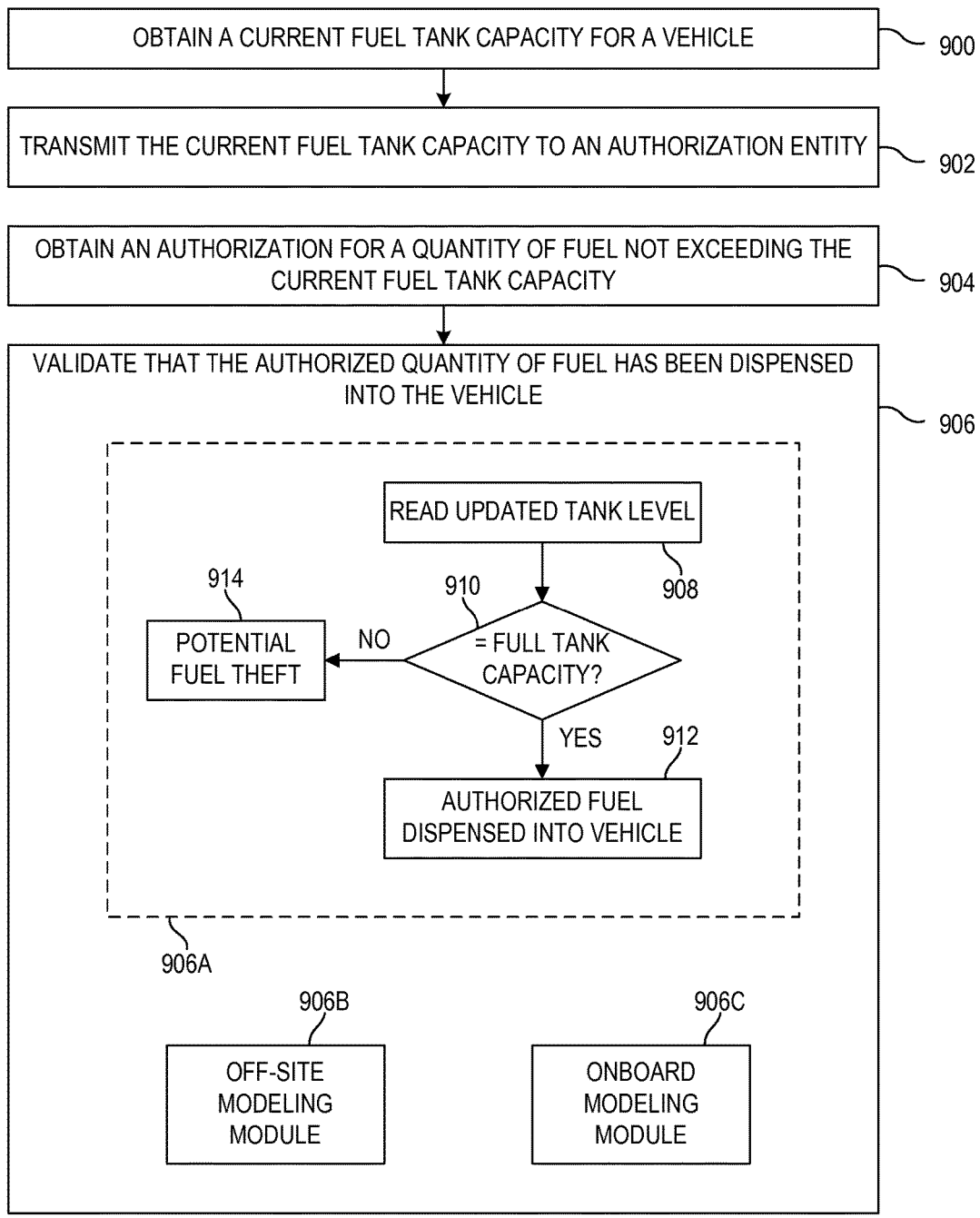
FIG. 9 depicts a process for validating that the authorized quantity of fuel has been dispensed into the proper vehicle.

An example of the validation described at block 614 of FIGS. 6A and 6B is shown in the flow diagram of FIG. 9. In this example, the current fuel tank capacity for a vehicle is obtained 900. The current fuel tank capacity is transmitted 902 to an authorization entity. Authorization for a quantity of fuel that does not exceed the current fuel tank capacity is obtained as shown at block 904. In the embodiment of FIG. 9, the process involves validating 906 that the authorized quantity of fuel has been dispensed into the proper vehicle. For example, as shown at block 906A, this validation 906 may be accomplished by reading 908 the updated tank level after the fuel has been dispensed into the target vehicle. If the updated tank level corresponds to the full tank capacity as determined at block 910, the authorized fuel has been dispensed into the proper vehicle as shown at block 912. If the updated tank level does not correspond to the full tank capacity as determined at block 910, it is indicative of potential fuel theft as depicted at block 914.

Another example of the validation 906 involves an off-site modeling module 906B and/or onboard modeling module 906C. These modeling modules correspond to, for example, the analysis and modeling module 704 of FIG. 7. By modeling a vehicle's expected fuel efficiency, the vehicle's route, RPM, speed, etc., the modeling process can provide estimates as to whether the fuel is being properly dispensed into the proper vehicle. For example, if a truck is authorized to receive 100 gallons of purchased fuel, but only 60 gallons of the purchased fuel are dispensed into the proper vehicle while 40 gallons are dispensed into an unauthorized vehicle, the truck will need to refill with fuel sooner and will exhibit a lower than expected fuel efficiency. If the modeling modules 906B and/or 906C properly model what the fuel efficiency should be, the modeling modules can conclude that some of the authorized fuel was not dispensed into the authorized vehicle. Such modeling functionality may be provided external to the vehicle as depicted by the off-site modeling module 906B, or may be provided on the vehicle, such as part of the OBC or other computing device, as noted by the onboard modeling module 906C.

Figure 10:
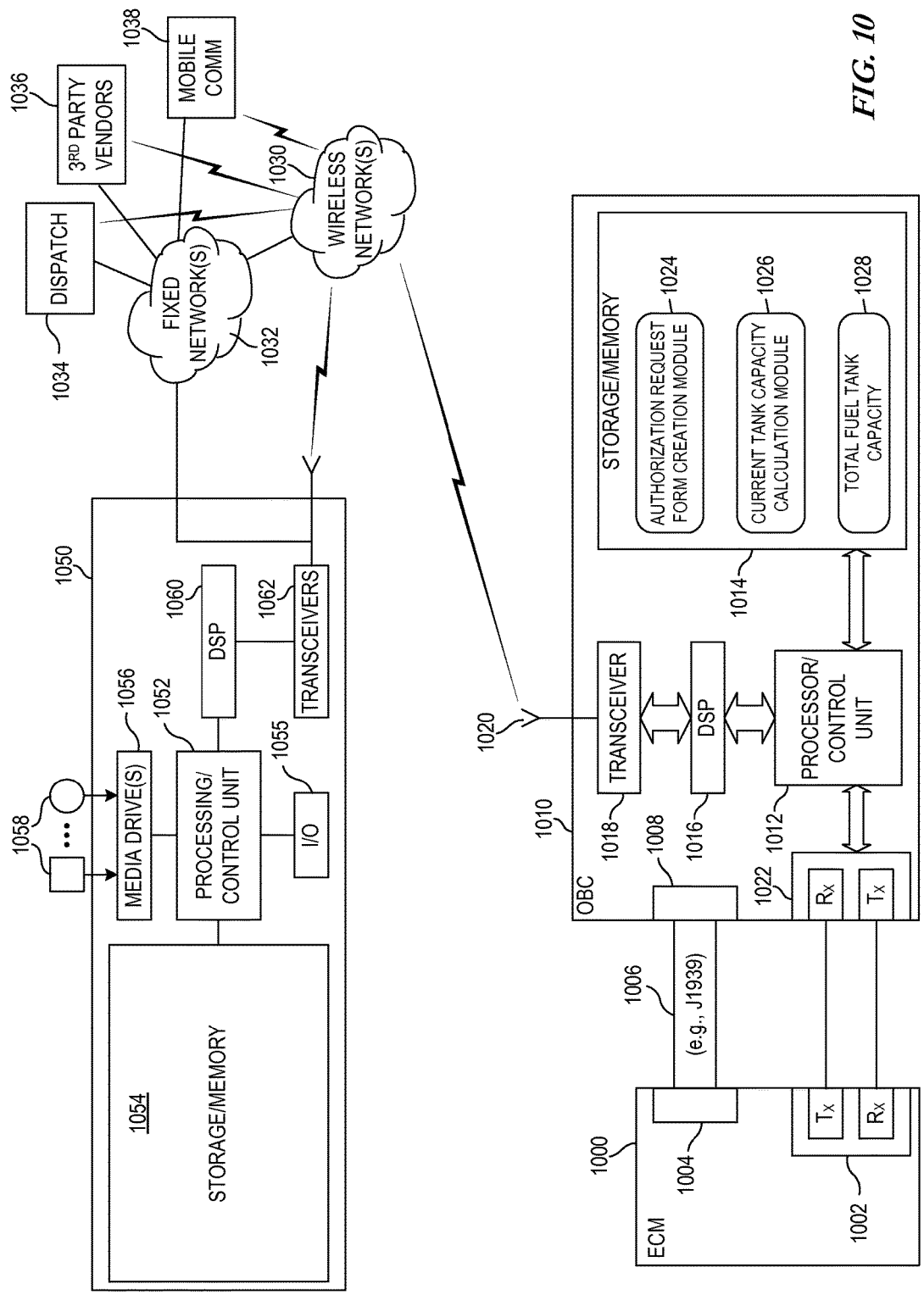
FIG. 10 illustrates a representative processing system that may be used in connection with the techniques described herein.

A representative system in which the fuel purchase authorization techniques may be implemented is shown in FIG. 10. An engine control module (ECM) 1000 is shown, which may include a transceiver 1002 including at least a transmitter $T_X$, and optionally a receiver $R_X$ to communicate with the onboard computer (OBC) 1010. In another embodiment, the ECM 1000 includes a bus connector 1004 to enable a bus 1006, such as an SAE J1939 bus, to connect to a bus connector 1008 at the OBC 1010. It should be noted that any connection between an engine control module (such as ECM 1000) and a computing device on the vehicle (such as OBC 1010) may be used to provide vehicle information to the vehicle computing device.

The OBC 1010 includes a processing/control unit 1012, such as a microprocessor, reduced instruction set computer (RISC), or other central processing module. The processing unit 1012 need not be a single device, and may include one or more processors. For example, the processing unit may include a master processor and one or more associated slave processors coupled to communicate with the master processor. The processing unit 1012 controls the basic functions of the OBC 1010 as dictated by programs available in the program storage/memory 1014. The program storage/memory 1014 may include an operating system and program modules for carrying out functions and applications on the OBC 1010. For example, the program storage may include one or more of read-only memory (ROM), flash ROM, programmable and/or erasable ROM, random access memory (RAM), subscriber interface module (SIM), wireless interface module (WIM), smart card, disk, CD-ROM, DVD, or other resident or removable memory device. The OBC 1010 may receive and/or store information on internal storage/memory 1014 or removable storage (not shown). The modules or other software operable with the processing unit 1012 to perform functions in accordance with the disclosure may also be transmitted to the OBC via data signals, such as being downloaded electronically via a network, such as the Internet.

The processor 1014 may have a user-interface (not shown), which may include a keyboard/keypad, speaker, microphone, switches, touch pad/screen, graphical user interface using a pointing device, trackball, joystick, and/or any other user interface mechanism. The OBC 1010 may include a digital signal processor (DSP) 1016 that may perform a variety of functions, including analog-to-digital (A/D) conversion, digital-to-analog (D/A) conversion, speech coding/decoding, encryption/decryption, error detection and correction, bit stream translation, filtering, etc. The transceiver 1018, generally coupled to an antenna 1020, transmits and receives the wireless signals such as cellular signals. Similar transmitters/receivers (e.g. transceivers) may further be provided for other communication mechanisms, such as Bluetooth transceivers, GPS receivers, etc. The OBC 1010 may also include a transceiver or other interface to communicate data directly via wired technologies, such as USB, IEEE-1394, etc. In one embodiment, a transceiver 1022 communicates with the ECM 1000. The illustrated OBC 1010 can communicate with any one or more of cellular, satellite and other mobile/wireless networks 1030.

The OBC 1010 includes storage and/or memory 1014 that stores the programs and/or data associated with the techniques described herein. For example, the authorization request form creation module 1024 represents a program having instructions executable via the processor 1012 to facilitate creation and entry of information in a fuel purchase authorization request. The total fuel tank capacity 1028 represents data, such as equipment master information, that indicates the total or maximum fuel tank capacity for that vehicle. The current tank capacity calculation module 1026 represents a program having instructions executable via the processor 1012 to calculate the current tank capacity based on, for example, the total fuel tank capacity 1028 and fuel tank level information that may be provided by the ECM 1000 or other device.

FIG. 10 also depicts a representative computing system 1050 operable on the network, that can represent any of the entities described herein, such as the dispatch entity 1034, third-party vendors 1036, mobile communications vendors 1038, etc. Thus, the computing arrangement 1050 represents any computing system in which the OBC 1010 can communicate with.

The computing system(s) 1050 may be communicated with via the wireless network(s) 1030 and/or fixed network(s) 1032. In one embodiment, the computing system 1050 represents at least the fuel analysis module. The system 1050 may be a single system or a distributed system. The illustrated computing system 1050 includes a processing arrangement 1052, such as one or more processors, which are coupled to the storage/memory 1054. The processor 1052 carries out a variety of standard computing functions as is known in the art, as dictated by software and/or firmware instructions. The storage/memory 1054 may represent firmware, media storage, memory, etc.

The processor 1052 may communicate with other internal and external components through input/output (I/O) circuitry 1055. The computing system 1050 may also include media drives 1056, such as hard and floppy disk drives, CD-ROM drives, DVD drives, and other media 1058 capable of reading and/or storing information. In one embodiment, software for carrying out the operations at the computing system 1050 may be stored and distributed on CD-ROM, diskette, magnetic media, removable memory, or other form of media capable of portably storing information, as represented by media devices 1058. Such software may also be transmitted to the system 1050 via data signals, such as being downloaded electronically via a network such as the data network 1032, Local Area Network (LAN) (not shown), wireless network 1030, and/or any combination thereof. The storage/memory 1054 and/or media devices 1058 may store various programs and data described herein for external entities.

The illustrated computing system 1050 may also include DSP circuitry 1060, and at least one transceiver 1062 (which is intended to also refer to discrete transmitter/receiver components). The server 1050 and transceiver(s) 1062 may be configured to communicate with one or both of the fixed network 1032 and wireless network 1030.

Hardware, firmware, software or a combination thereof may be used to perform the functions and operations described herein. Using the foregoing specification, some embodiments described herein may be implemented as a machine, process, or article of manufacture by using standard programming and/or engineering techniques to produce programming software, firmware, hardware or any combination thereof. Any resulting program(s), having computer-readable program code, may be embodied within one or more computer-usable media such as memory devices or transmitting devices, thereby making a computer program product, computer-readable medium, or other article of manufacture according to the invention. As such, the terms "computer-readable medium," "computer program product," or other analogous language are intended to encompass a computer program existing permanently or temporarily on any computer-usable medium such as on any storage or memory device.

From the description provided herein, those skilled in the art are readily able to combine software created as described with appropriate general purpose or special purpose computer hardware to create a computing system and/or computing subcomponents embodying the techniques supported herein, and to create a computing system(s) and/or computing subcomponents for carrying out the method(s) supported herein.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A processor-implemented method comprising:
   obtaining a current fuel tank capacity for a vehicle;
   transmitting the current fuel tank capacity to an authorization entity;
   obtaining an authorization for dispensing a quantity of fuel not exceeding the current fuel tank capacity;
   determining whether the vehicle is traveling on a predetermined route;
   authorizing the vehicle to receive the authorized quantity of fuel based on compliance with the predetermined route;
   receiving an updated current fuel tank capacity for the vehicle after the authorized quantity of fuel has been dispensed; and
   determining whether the updated current fuel tank capacity substantially corresponds to a total fuel tank capacity for the vehicle at least in part using a processor.

2. The method of claim 1, further comprising transmitting a request for authorization to purchase a quantity of fuel corresponding to the current fuel tank capacity.

3. The method of claim 2, wherein the request for authorization is ultimately directed to an authorization module capable of limiting the purchase to the quantity of fuel corresponding to the current fuel tank capacity.

4. The method of claim 3, wherein the authorization module is implemented by a fuel vendor, and the authorization for the quantity of fuel is provided by way of a fuel card configured to allow fuel to be dispensed for that fuel transaction in the quantity corresponding to the current fuel tank capacity.

5. The method of claim 1, wherein obtaining an authorization for dispensing a quantity of fuel not exceeding the current fuel tank capacity comprises obtaining an authorization for a quantity of fuel substantially corresponding to the current fuel tank capacity.

6. The method of claim 1, wherein obtaining an authorization for dispensing a quantity of fuel not exceeding the current fuel tank capacity comprises obtaining the authorization for a quantity of fuel from a fuel vendor by way of a card electronically readable at a fuel dispensing machine.

7. The method of claim 1, further comprising limiting the quantity of fuel available to the vehicle for dispensing by causing a fuel dispensing machine to stop dispensing fuel when the authorized quantity of fuel has been dispensed.

8. The method of claim 1, wherein obtaining a current fuel tank capacity comprises determining the current fuel tank capacity in response to initiation of a fuel transaction.

9. The method of claim 1, wherein obtaining a current fuel tank capacity comprises determining an available capacity for additional fuel in the fuel tank of the vehicle at the time of the request for authorization of the fuel.

10. The method of claim 9, further comprising facilitating user creation of an electronic form to provide the request for authorization of the fuel for the vehicle.

11. The method of claim 1, wherein obtaining the current fuel tank capacity comprises receiving an estimated current fuel tank capacity from an engine control module equipped on the vehicle.

12. The method of claim 1, wherein obtaining the current fuel tank capacity comprises receiving an estimated current fuel tank level from an engine control module equipped on the vehicle, and calculating the current fuel tank capacity based on the current fuel tank level and a total fuel tank capacity of the fuel tank on that vehicle.

13. The method of claim 12, further comprising receiving the total fuel tank capacity from a remote source.

14. The method of claim 13, wherein the remote source comprises a vehicle identification number (VIN) decoder, and wherein receiving the total fuel tank capacity from a remote source comprises receiving the total fuel tank capacity from equipment information obtained via the VIN decoder.

15. The method of claim 13, wherein the remote source comprises a fuel analysis module capable of providing fuel efficiency modeling for the vehicle and having access to the vehicle's equipment information including the total fuel tank capacity.

16. The method of claim 12, wherein calculating the current fuel tank capacity comprises subtracting the current fuel tank level from a total fuel tank capacity of the fuel tank on that vehicle.

17. The method of claim 12, wherein the current fuel tank level is provided as a filled percentage of the total fuel tank capacity of the fuel tank for the vehicle, and wherein calculating the current fuel tank capacity comprises multiplying the filled percentage and the total fuel tank capacity of the fuel tank on that vehicle.

18. The method of claim 1, wherein obtaining the current fuel tank capacity comprises receiving a current fuel tank level from at least one fuel tank level sensor, and determining the current fuel tank capacity from a difference of a maximum fuel tank capacity for that vehicle and the current fuel tank level.

19. The method of claim 18, further comprising receiving equipment information including at least the maximum fuel tank capacity for the vehicle.

20. The method of claim 1, wherein obtaining a current fuel tank capacity for the vehicle comprises:
wirelessly providing an indication of the current fuel tank capacity from an engine control module; and
receiving the indication of the current fuel tank capacity at a mobile device within wireless transmission range of the engine control module.

21. The method of claim 20, wherein transmitting the current fuel tank capacity to an authorization entity comprises transmitting the current fuel tank capacity via the mobile device.

22. The method of claim 1, further comprising recording an indication of potential fuel theft if the updated current fuel tank capacity does not substantially correspond to a total fuel tank capacity for the vehicle.

23. The method of claim 1, wherein authorization is further dependent on a location in which the vehicle attempts to dispense the quantity of fuel.

24. A processor-implemented method comprising:
calculating, at least in part using a processor, a current fuel tank capacity for a vehicle based on a difference between a previously known fuel tank level for the vehicle and a calculated fuel consumption based at least on estimated fuel consumption rate and distance traveled;
providing the calculated current fuel tank capacity to an authorization module;
receiving an authorization of a quantity of authorized fuel from the authorization module;
making the authorization of the quantity of authorized fuel available at the vehicle to limit a quantity of dispensed fuel to the quantity of authorized fuel;
determining whether the vehicle is traveling on a predetermined route;
authorizing the vehicle to receive the authorized quantity of fuel based on compliance with the predetermined route;
receiving an updated current fuel tank capacity for the vehicle after the authorized quantity of fuel has been dispensed; and
determining whether the updated current fuel tank capacity substantially corresponds to a total fuel tank capacity for the vehicle.

25. An apparatus comprising:
a receiver configured to receive a fuel tank level indication for a fuel tank in a vehicle;
storage to at least temporarily store a total fuel tank capacity of the fuel tank;
a processor configured to:
calculate a quantity of fuel that would fill the fuel tank based on at least the fuel tank level indication and the total fuel tank capacity of the fuel tank, and
determine whether the vehicle is traveling on a predetermined route; and
a transmitter configured to wirelessly transmit an authorization request to an authorization entity to obtain authorization to purchase fuel for no more than the quantity of fuel that would fill the fuel tank, wherein the receiver is configured to receive an updated current fuel tank capacity for the vehicle after the authorized quantity of fuel has been dispensed and the processor is configured to authorize the vehicle to receive the authorized quantity of fuel based on compliance with the predetermined route and determine whether the updated current fuel tank capacity substantially corresponds to a total fuel tank capacity for the vehicle.

26. The apparatus as in claim 25, wherein the receiver comprises an SAE J1939 bus connector, and is coupled to receive the fuel tank level from an engine control module (ECM) via the SAE J1939 bus connector.

27. The apparatus as in claim 26, further comprising a sensor in the fuel tank to sense a level of fuel in the fuel tank, and to provide the sensed level of fuel to the ECM to provide the fuel tank level indication in response thereto.

28. The apparatus as in claim 25, wherein the receiver comprises a wireless receive configured to wirelessly receive the fuel tank level indication from a remote entity that has calculated the fuel tank level indication.

29. The apparatus as in claim 25, wherein the processor is further configured to facilitate entry of a fuel purchase form that includes the calculated quantity of fuel that would fill the fuel tank, and wherein the transmitter is configured to wirelessly transmit the fuel purchase form as the authorization request to the authorization entity.

30. An apparatus comprising:
means for obtaining a current fuel tank capacity for a vehicle;
means for transmitting the current fuel tank capacity to an authorization entity;
means for obtaining an authorization for dispensing a quantity of fuel not exceeding the current fuel tank capacity;
means for determining whether the vehicle is traveling on a predetermined route;
means for authorizing the vehicle to receive the authorized quantity of fuel based on compliance with the predetermined route;
means for receiving an updated current fuel tank capacity for the vehicle after the authorized quantity of fuel has been dispensed; and
means for determining whether the updated current fuel tank capacity substantially corresponds to a total fuel tank capacity for the vehicle.

31. A non transitory computer-readable medium having instructions stored thereon which are executable by a computer system for performing steps comprising:
obtaining a current fuel tank capacity for a vehicle;
transmitting the current fuel tank capacity to an authorization entity;
obtaining an authorization for dispensing a quantity of fuel not exceeding the current fuel tank capacity;
determining whether the vehicle is traveling on a predetermined route;
authorizing the vehicle to receive the authorized quantity of fuel based on compliance with the predetermined route;
receiving an updated current fuel tank capacity for the vehicle after the authorized quantity of fuel has been dispensed; and
determining whether the updated current fuel tank capacity substantially corresponds to a total fuel tank capacity for the vehicle.

32. A system comprising:
an onboard computing device on a vehicle, comprising:
a receiver configured to receive a fuel tank level indication for a fuel tank in a vehicle;
storage to at least temporarily store a total fuel tank capacity of the fuel tank;
a processor configured to:
calculate a quantity of fuel that would fill the fuel tank based on at least the fuel tank level indication and the total fuel tank capacity of the fuel tank, and
determine whether the vehicle is traveling on a predetermined route;
a transmitter configured to wirelessly transmit an authorization request to an authorization entity to obtain authorization to purchase fuel for no more than the quantity of fuel that would fill the fuel tank; and
a fuel dispensing mechanism coupled to receive the authorization to purchase fuel for no more than the quantity of fuel that would fill the fuel tank, and to disable dispensing of the fuel after the quantity of fuel that would fill the fuel tank has been dispensed, wherein the receiver is configured to receive an updated current fuel tank capacity for the vehicle after the authorized quantity of fuel has been dispensed and the processor is configured to authorize the vehicle to receive the authorized quantity of fuel based on compliance with the predetermined route and determine whether the updated current fuel tank capacity substantially corresponds to a total fuel tank capacity for the vehicle.

33. The method of claim 1, wherein determining whether the updated current fuel tank capacity substantially corresponds to a total fuel tank capacity for the vehicle further comprises determining whether the updated fuel tank capacity substantially corresponds to a total fuel tank capacity for the vehicle at a point-of-sale.

34. The method of claim 1, further comprising:
determining whether the vehicle is at a particular fueling station;
if the vehicle is located at the particular fueling station, authorizing the vehicle to receive the authorized quantity of fuel; and
if the vehicle is not located at the particular fueling station, denying authorization to receive the authorized quantity of fuel.

\* \* \* \* \*